(12) United States Patent
Perrin et al.

(10) Patent No.: US 8,857,231 B2
(45) Date of Patent: Oct. 14, 2014

(54) STEERING LOCK ANTITHEFT DEVICE FOR MOTOR VEHICLE

(75) Inventors: Christophe Perrin, Creteil (FR); Donatien Frot, Creteil (FR)

(73) Assignee: Valeo Securite Habitacle, Créteil (FR)

( * ) Notice: Subject to any disclaimer, the term of this patent is extended or adjusted under 35 U.S.C. 154(b) by 0 days.

(21) Appl. No.: 13/876,482

(22) PCT Filed: Oct. 13, 2011
(Under 37 CFR 1.47)

(86) PCT No.: PCT/EP2011/067932
§ 371 (c)(1),
(2), (4) Date: Oct. 15, 2013

(87) PCT Pub. No.: WO2012/042064
PCT Pub. Date: Apr. 5, 2012

(65) Prior Publication Data
US 2014/0047876 A1 Feb. 20, 2014

(30) Foreign Application Priority Data
Sep. 28, 2010 (FR) ...................................... 10 03841

(51) Int. Cl.
*B60R 25/02* (2013.01)
*B60R 25/021* (2013.01)

(52) U.S. Cl.
CPC .............. *B60R 25/021* (2013.01); *B60R 25/02* (2013.01)
USPC .................................. 70/252; 70/183; 70/186

(58) Field of Classification Search
USPC ..................... 70/182–186, 252, 245
See application file for complete search history.

(56) References Cited

U.S. PATENT DOCUMENTS 4,292,483 A * 9/1981 Roytberg .................... 200/43.03
4,659,883 A * 4/1987 Poschet ...................... 200/43.03

(Continued)

FOREIGN PATENT DOCUMENTS

DE 21 57 462 A1 5/1972
DE 25 31 467 A1 1/1976

(Continued)

OTHER PUBLICATIONS

International Search Report issued in PCT/EP2011/067932 mailed Nov. 16, 2011 (5 pages).

*Primary Examiner* — Suzanne Barrett
(74) *Attorney, Agent, or Firm* — Osha Liang LLP (57) ABSTRACT

The invention relates to a steering lock antitheft device for a motor vehicle comprising: an antitheft body (3) intended to house a lock (2) capable of turning between a neutral position (STOP) and a start position (DEM) via an intermediate position (MARCHE), a cam (4) intended to rotate as one with the lock (2) to actuate locking means of the antitheft device (1) according to the position of the lock (2), a nonreturn means to prevent the said cam (4) from turning in the opposite direction towards the start position (DEM) once it has reached the intermediate position (MARCHE) when moving from the start position (DEM) towards the neutral position (STOP) without first of all moving via the neutral position (STOP), characterized in that a cam profile (5) is formed in a radial wall of the said cam (4) and in that the said antitheft device (1) further comprises a control finger (6) and a means of elastically returning the said control finger (6) against the action of the said cam profile (5), the said cam profile (5) and the said control finger (6) working together firstly to form a nonreturn means and secondly to index the angular position of the cam (4).

13 Claims, 6 Drawing Sheets

(56) References Cited

U.S. PATENT DOCUMENTS

| | | | |
|---|---|---|---|
| 4,759,203 A * | 7/1988 | Lieb et al. | 70/185 |
| 7,302,817 B2 * | 12/2007 | Ohtaki et al. | 70/186 |
| 7,342,189 B2 * | 3/2008 | Bravard et al. | 200/43.08 |
| 8,079,239 B2 * | 12/2011 | Chung | 70/252 |
| 8,408,031 B2 * | 4/2013 | Hirashita | 70/237 |
| 8,429,942 B2 * | 4/2013 | Kakizaki | 70/237 |
| 2005/0034493 A1 * | 2/2005 | Wittwer et al. | 70/186 |
| 2008/0041128 A1 * | 2/2008 | Ohtaki et al. | 70/237 |
| 2010/0192649 A1 * | 8/2010 | Nakamoto | 70/353 |
| 2011/0296881 A1 * | 12/2011 | Tamezane et al. | 70/252 |

FOREIGN PATENT DOCUMENTS

| | | |
|---|---|---|
| DE | 30 17 706 A1 | 11/1980 |
| EP | 0 669 234 A1 | 8/1995 |
| FR | 2 463 249 A1 | 2/1981 |

* cited by examiner

STEERING LOCK ANTITHEFT DEVICE FOR MOTOR VEHICLE

The invention relates to a steering lock antitheft device for a motor vehicle comprising an antitheft body designed to receive a lock capable of rotating between a neutral position and a start position passing via an intermediate position, a cam designed to be fixed in rotation to the lock to actuate the locking means of the antitheft device as a function of the position of the lock and a non-return means to prevent said cam from rotating in the opposite direction toward the start position once it has reached the intermediate position when it passes from the start position to the neutral position without first passing via the neutral position.

In particular, in an antitheft device of which the lock is able to adopt at least three positions, respectively "stop", "operate" and "start", the invention relates to a non-return means preventing said cam from carrying out a second rotational cycle toward the "start" position following a first cycle from the "operate" position toward the "start" position without first passing via the "stop" position or via an intermediate position between the "stop" and "operate" positions.

An antitheft device for a motor vehicle is already known, said antitheft device comprising a lock rotating between first and second extreme angular positions and which, when it is actuated using an appropriate key, unlocks a locking bolt of the steering column of the motor vehicle and activates the supply of electrical power to a certain number of electrical circuits of the vehicle and, in particular, the starting of the engine.

Thus, by pivoting the lock by means of its key, it is possible to pass the lock from a first angular position, for example the "stop" position in which the majority of electrical circuits of the vehicle are cut off from the power supply of the battery, into three other successive positions, "accessories", "operate" and "start" in which the electrical commutator establishes the power supply to different circuits and components of the vehicle.

Generally, the "operate" position corresponds to the electrical power supply of the ignition circuit of the internal combustion engine of the vehicle. The "start" position supplies current to the electric starter motor which is capable of driving in rotation the engine shaft of the internal combustion engine of the vehicle and which has the function of starting the internal combustion engine. The starter motor, which takes a considerable amount of current, is provided so as to function for only a few successive seconds with each activation. More specifically, it is preferable to repeat the starting operation several times if it fails, each attempt at starting having to be of short duration. Thus, to start the internal combustion engine of the vehicle, the driver, for example by means of the key of the lock, brings the lock from a neutral position, for example the "stop" position or the "accessories" position, toward the "start" position passing via the "operate" position. After passing via the "start" position, the commutator is moved by a restoring spring toward the "operate" position thereof.

However, it has become apparent that there could be a risk of damage to the starter motor or the internal combustion engine when the driver causes further power to be supplied to the electric starter motor when the internal combustion engine is already in operation. A further risk, when the internal combustion engine has not yet been correctly started by a first starting attempt, is also if the user causes the starter motor to restart too rapidly, before the different mobile parts of the starter motor and the transmission of the vehicle have returned to their initial position and have stopped rotating.

To this end, non-return means have already been proposed which make it possible to avoid any inadvertent manipulation capable of leading to the breakdown of one of the mechanical elements necessary for the correct operation of the vehicle.

The object of the invention is to design a steering lock antitheft device for a motor vehicle having a non-return means which is more efficient than those of the prior art and which is both reliable, compact and inexpensive to produce.

To this end, the subject of the invention is a steering lock antitheft device for a motor vehicle comprising:
  an antitheft body designed to receive a lock capable of rotating between a neutral position and a start position passing via an intermediate position,
  a cam designed to be fixed in rotation to the lock to actuate the locking means of the antitheft device as a function of the position of the lock,
  a non-return means to prevent said cam from rotating in the opposite direction toward the start position once it has reached the intermediate position when it passes from the start position to the neutral position without first passing via the neutral position,
characterized in that a cam profile is formed in a radial wall of said cam and in that said antitheft device further comprises a control finger and a resilient return means for said control finger counter to the action of said cam profile, said cam profile and said control finger cooperating, on the one hand, to form a non-return means and, on the other hand, to index the angular position of the cam. The radial relief portions of the cam profile are thus felt by the user when turning the key of the lock. The cam profile thus cooperates with the control finger, both to prevent the cam from rotating in the opposite direction toward the start position and to index the angular position of the cam. Thus it is avoided that two separate means are provided on the cam, potentially requiring complex machining operations for implementing said two functions.

According to an embodiment, the control finger is urged to pivot toward the cam profile and in axial translation against an axial abutment of the cam profile. Thus, when the cam is driven in rotation, the radial relief portions of the cam profile produce a haptic sensation for the user. Furthermore, the axial abutment makes it possible to retain the control finger in the cam profile.

The antitheft device may comprise a support in which a guide rail is formed. The control finger may have a shaped, for example cylindrical, portion to translate and pivot in the guide rail. Said resilient return means may be interposed between one end of the control finger and said support.

Said support, said resilient return means and said control finger may also form a non-return and indexing module able to be manipulated, having means for assembling to said antitheft body. The non-return and indexing module may thus be easily assembled to the antitheft body during the assembly procedure by means which are both reliable, compact and inexpensive to produce.

According to an embodiment, said cam profile comprises a forward track cooperating with the control finger on a forward rotational trajectory of the cam from the neutral position to the start position passing via the intermediate position and a return track cooperating with the control finger on a return rotational trajectory of the cam from the start position to the neutral position passing via the intermediate position, the return track further comprising a non-return radial relief portion cooperating with the control finger in the intermediate position to block the rotation of the cam in the opposite direction toward the start position.

Said radial non-return relief portion comprises, for example, a step. The step may have an upstream ramp portion, a transverse wall and a hollow portion perpendicular to said transverse wall, the upstream ramp portion thickening radially as far as the transverse wall. The position of the control finger in the hollow portion of the cam profile after having rocked from the step forms a stable indexing position. The non-return radial relief portion thus forms a non-return means in addition to an indexing means of the intermediate position.

Moreover, in order to index the neutral and intermediate positions adopted by the cam, the cam profile may have further radial relief portions providing a haptic sensation to the user handling the lock key. Thus, for example, it is provided that said cam profile has at least one inclined indexing surface cooperating with the control finger to index the departure from, or the arrival into, a neutral position or intermediate position of the cam.

More specifically, the axial abutment may have a first inclined indexing surface followed by a hollow portion cooperating with the control finger to index the departure from, or the arrival into, the neutral position of the cam. The axial abutment of the forward track has a second inclined indexing surface cooperating with the control finger to index the arrival into, or the departure from, the intermediate position of the cam. The return track of the cam profile has a third inclined indexing surface cooperating with the control finger to index the departure of the cam from the intermediate position.

Furthermore, the axial abutment of the forward track is able to retract into the start position to permit the control finger to cooperate with the axial abutment of the return track offset axially from the axial abutment of the forward track, thus causing the control finger to rock from the forward track toward the return track so that the control finger is able to cooperate with the radial non-return relief portion.

The axial abutment of the cam profile is, for example, formed by a peripheral end edge of the cam between the neutral position and the intermediate position of the forward track. Moreover, the axial abutment of the return track has, for example, a rounded portion between the intermediate and neutral positions, to guide the return of the control finger below the peripheral end edge of the cam.

Further advantages and features will become apparent from reading the description of the invention provided by way of example, in addition to the accompanying figures, in which.

In these figures, identical elements carry the same reference numerals.

FIGS. 1 to 12 illustrate an embodiment of a steering lock antitheft device for a motor vehicle 1 designed to be assembled around a steering column. In the manner known per se, and not shown in the figures, the antitheft device 1 comprises locking means comprising a bolt mounted so as to be mobile in translation in an antitheft body, between a released position in which it is designed to be arranged at a distance from the steering column and a locked position in which it is designed to block said column. The bolt is activated so as to be displaced by means of a lock 2, via a means of driving the bolt coupled to a cam of the antitheft device. The inlet of the key of the lock at the front (AV) of the antitheft device 1 may be seen in FIG. 1.

Figure 1:
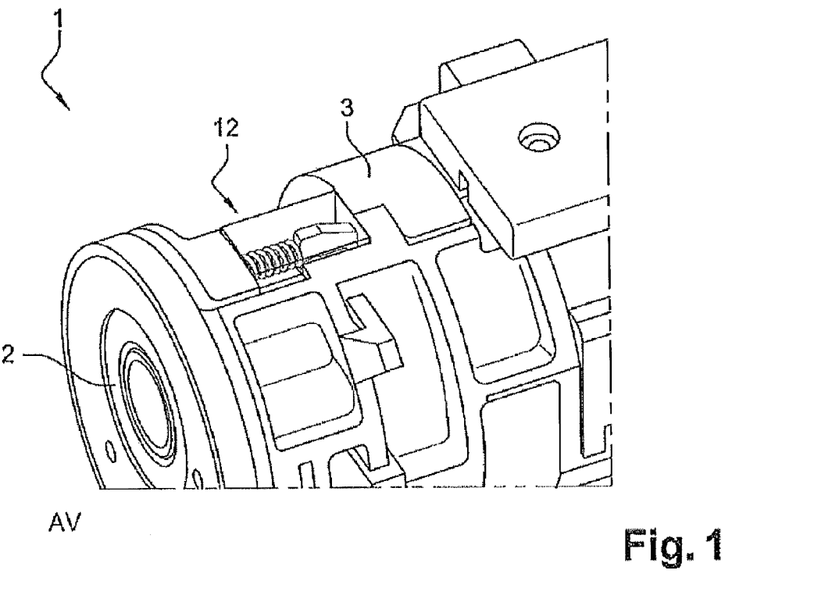
FIG. 1 shows a partial view in perspective of a steering lock antitheft device for a motor vehicle.
Figure 2:
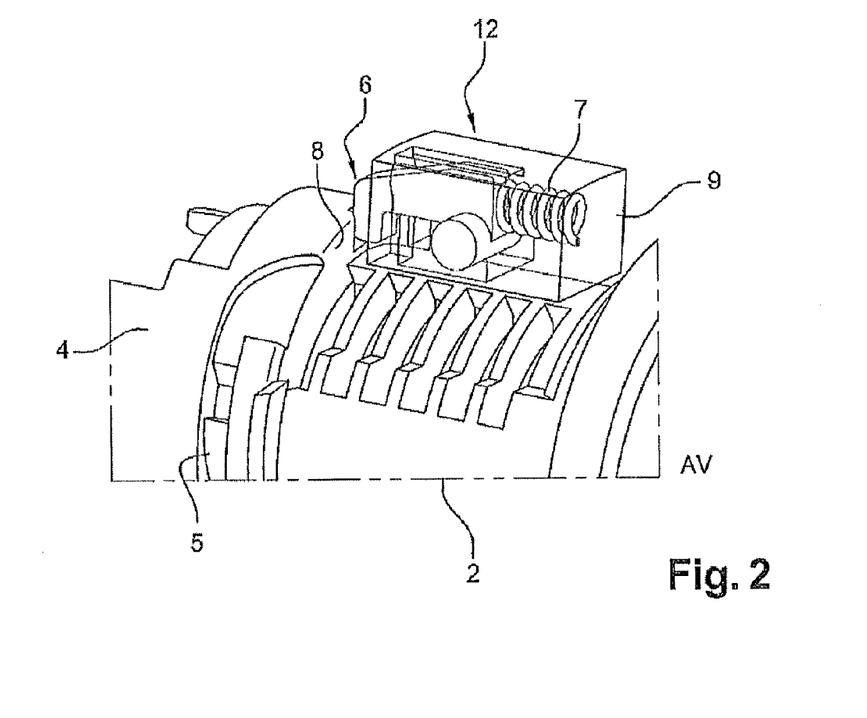
FIG. 2 shows a cam, a lock and a non-return and indexing module of the antitheft device of FIG. 1, the cam being in the neutral position.

As may be seen in FIG. 2, the lock 2 is fixed to the cam 4 at the rear end of the lock 2. Once mounted together in the antitheft body 3, the lock 2 and the cam 4 are able to rotate together under the action of the corresponding lock key about a rotational axis parallel to a direction known as the axial direction, between a plurality of angular positions, together with an electrical commutator, to activate various components of the vehicle. Thus, the lock 2 and the cam 4 may be placed in a first angular position, known as the neutral position, such as the "stop" position, an intermediate angular position, known as the "operate" position, and a second extreme angular position, opposing the first neutral angular position, known as the "start" position. In the neutral stop position, the majority of electrical circuits of the vehicle are cut off from the power supply of the battery. The intermediate operating position corresponds, for example, to the supply of electrical power to the ignition circuit of the internal combustion engine of the vehicle. The start position supplies an electric starter motor with current, said starter motor being capable of driving in rotation the engine shaft of the internal combustion engine of the vehicle and having the function of starting the internal combustion engine. The neutral, intermediate and start positions follow one another when the lock 2 and the cam 4 are displaced from the neutral position to the start position. After passing via the start position, the cam 4 is resiliently returned by a restoring spring toward its intermediate start position.

As seen above, apart from the electrical functions of the vehicle, the lock 2 activates the translation of the bolt of the locking means via the cam 4, generally so that the bolt protrudes into the steering column when the lock 2 is in the stop position and the key removed, the bolt being kept inserted in the other positions of the lock 2.

The antitheft device 1 further comprises a non-return means for preventing the cam 4 from rotating in the opposite direction toward the start position after it has reached the intermediate position when it passes from the start position toward the neutral position without first passing via the neutral position.

It is provided that a cam profile 5 (FIG. 2) having at least one radial relief portion is formed in a radial wall of the cam 4, i.e. on the periphery thereof. Moreover, the antitheft device 1 comprises a control finger 6 and a resilient return means 7 to urge the control finger 6 into abutment against the cam profile 5. The cam profile 5 and the control finger 6 cooperate, on the one hand, to form a non-return means and, on the other hand, to index the angular position of the cam 4. The radial relief portions of the cam profile 5 are thus felt by the user when turning the lock key such that the cam profile 5 cooperates with the control finger 6 both to ensure the non-return function of the cam and to index the cam position 4. Thus it is avoided having to provide two separate means on the cam 4, potentially requiring complex machining operations for implementing said two functions.

Moreover, it is provided that the control finger 6 is urged to pivot toward the cam profile 5 and in axial translation against an axial abutment 8 of the cam profile 5. Thus, when the cam 4 is driven in rotation, the radial relief portions of the cam profile 5 produce a haptic sensation for the user and the axial abutment 8 holds the control finger 6 in the cam profile, the radial relief portions and axial abutment 8 participating in the non-return function of the cam 4.

Figure 3:
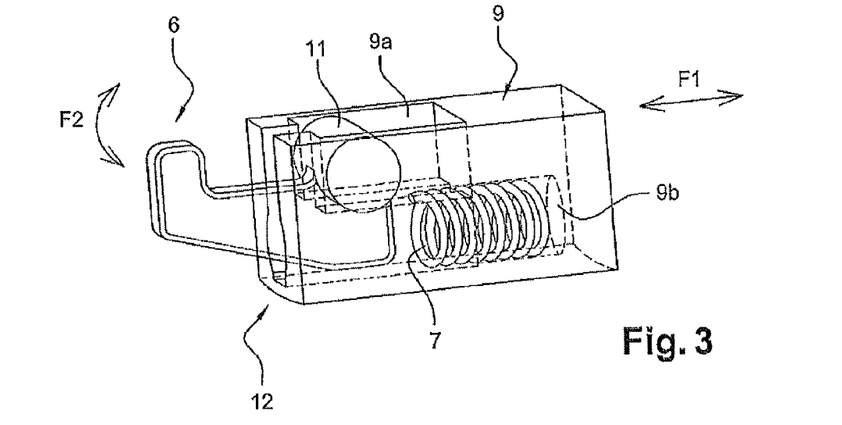
FIG. 3 shows a non-return and indexing module in the assembled state.
Figure 4:
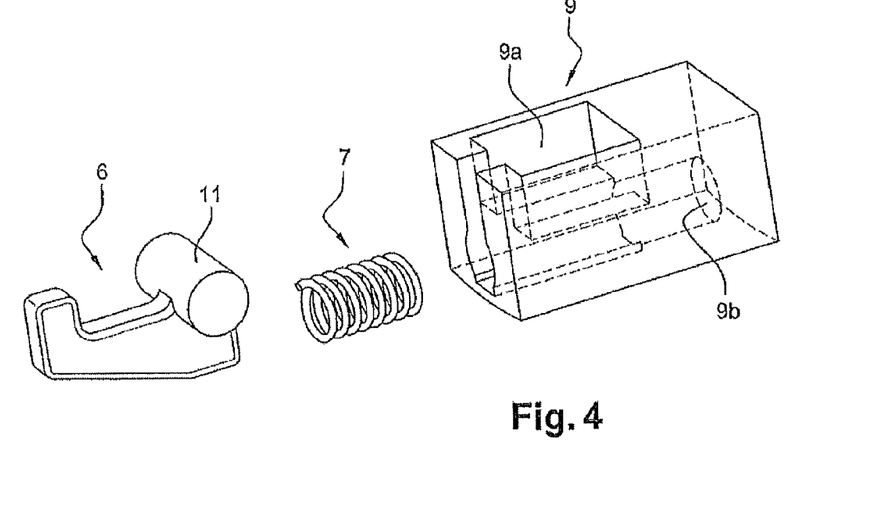
FIG. 4 shows the non-return and indexing module of FIG. 3 in the disassembled state.

According to the embodiment shown in FIGS. 3 and 4, the antitheft device 1 comprises a support 9 in which a guide rail 9a is formed. The control finger 6 also has a shaped portion 11 to cooperate in translation with the guide rail 9a (according to the arrow F1) and to pivot toward the cam profile 5 (according to the arrow F2) in the guide rail 9a. The shaped portion 11 has, for example, a cylindrical shape, the axis of revolution thereof being oriented transversely to the direction of translation F1 of the guide rail 9a.

It is possible to provide that the resilient return means 7, such as a thrust spring, is housed in a blind hole 9b of the support 9, the resilient return means 7 being interposed between an end of the control finger 6 and the support 9. The control finger 6 is thus resiliently returned by the thrust spring toward its protruding position in contact with the cam profile 5.

Moreover, the support 9, the resilient return means 7 and the control finger 6 may form an autonomous non-return and indexing module 12, i.e. a module arranged such that it is able to be manipulated and remains assembled without having to act to support its elements thus assembled (see for example FIGS. 1 and 3) having assembly means, such as clip means (not shown), to the antitheft body 3. The non-return and indexing module 12 thus may be easily assembled to the antitheft body 3 during the assembly process, using means which are both reliable, compact and inexpensive to produce. According to a further embodiment, not shown, the support 9 is directly integrated in the antitheft body 3.

Figure 5:
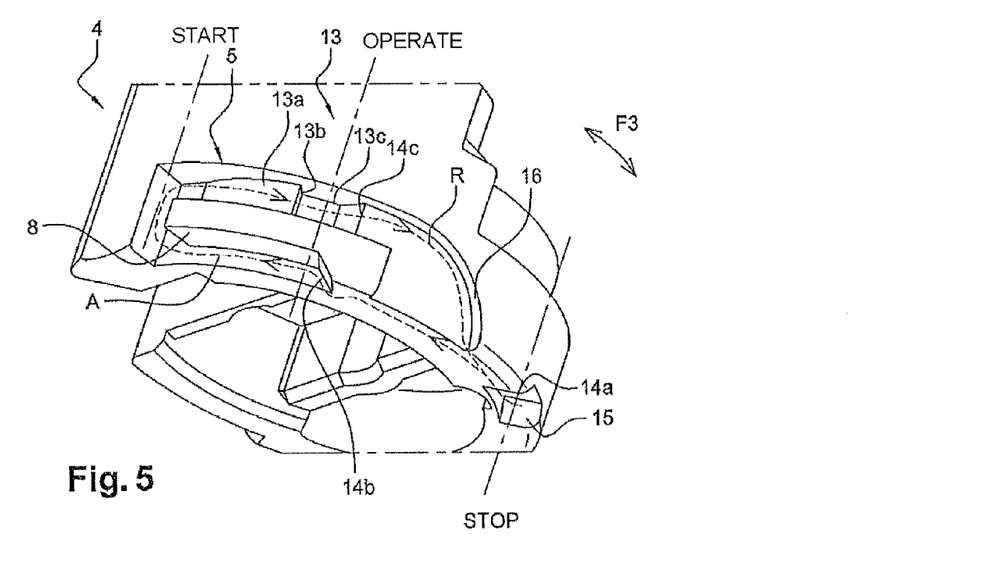
FIG. 5 shows a partial perspective view of the cam of FIG. 2.

As may be seen in FIG. 5, the cam profile 5 comprises a forward track A and a return track R. By "forward track" A, is defined the part of the cam profile 5 cooperating with the control finger 6 on the forward rotational trajectory of the cam from the neutral position, in this case the position STOP toward the start position START, passing via the intermediate position OPERATE. By "return track" R, is defined the part of the cam profile 5 cooperating with the control finger 6 on the return trajectory of the cam from the start position START to the neutral position, given by way of example here as being the position STOP, passing via the intermediate position OPERATE. The forward track A cooperates with the control finger 6 with a clockwise rotation of the cam 4. The return track R cooperates with the control finger 6 with an anticlockwise rotation of the cam 4 (see the double arrow F3).

The return track R further comprises a radial non-return relief portion 13 cooperating with the control finger 6 in the intermediate position OPERATE to block the rotation in the opposite direction (i.e. clockwise) of the cam 4 to the start position START after it has reached the intermediate position OPERATE.

The radial non-return relief portion 13 comprises, for example, a step. The step may have an upstream ramp portion 13a thickening radially as far as a transverse wall 13b of the radial non-return relief portion 13. The ramp 13a may be slightly convex. Said ramp relief portion 13a causes the control finger 6 to pivot against its resilient activation. The wall 13b is transverse to the rotational direction of the cam 4, perpendicular to a hollow portion 13c, so that once the step is crossed, the control finger 6 cooperates with the transverse wall 13b to block the rotation of the cam 4 from the intermediate position OPERATE to the start position START. The position of the control finger 6 in the hollow portion 13a of the cam profile 5 after having rocked from the step forms a stable indexing position. The radial non-return relief portion 13 thus forms a non-return means in addition to an indexing means of the intermediate position OPERATE.

Moreover, in order to index the neutral and intermediate positions adopted by the cam 4, the cam profile has other radial relief portions producing a haptic sensation for the user handling the lock key.

It is provided, for example, that the cam profile 5 has at least one inclined indexing surface cooperating with the control finger 6 to index the departure from, or the arrival into, a neutral or intermediate position of the cam.

Thus, and as may be seen in FIG. 5, the axial abutment 8 has a first inclined indexing surface 14a followed by a hollow portion 15 cooperating with the control finger 6 to index the departure from, or the arrival into, the neutral position STOP of the cam 4. The axial abutment 8 of the forward track A has a second inclined indexing surface 14b cooperating with the control finger 6 to index the arrival into, or the departure from, the intermediate position OPERATE of the cam 4. The return track R of the cam profile 5 has a third inclined indexing surface 14c cooperating with the control finger 6 to index the departure of the cam 4 from the intermediate position OPERATE, the hollow portion 13b thus thickening radially after the step of the non-return relief portion 13.

The inclined indexing surfaces 14a, 14b, 14c modify the rotational resistance of the lock, producing a haptic sensation to index the departure from, or the arrival into, a neutral or intermediate position of the cam 4.

Moreover, the axial abutment 8 of the forward track A retracts in the start position START to permit the control finger 6 to cooperate with the axial abutment 8 of the return track R, offset axially from the axial abutment of the forward track. The cam profile 5 is thus configured to rock the control finger 6 from the forward track A toward the return track R in the start position START, so that the control finger 6 cooperates with the radial non-return relief portion 13 on the return track R reaching the intermediate position OPERATE.

The axial abutment 8 of the cam profile 5 may be formed in a peripheral end edge of the cam 4 between the neutral position STOP and the intermediate position OPERATE of the forward track A. Moreover, the axial abutment 8 of the return track R has a rounded portion 16 between the intermediate position OPERATE and neutral position STOP to guide the return of the control finger below the peripheral end edge of the cam 4.

During operation, initially considering the lock 2 in the neutral position STOP (FIGS. 2 and 6), the control finger 6 is interlocked and indexed in the hollow portion 15 of the axial abutment 8. The rotation of the lock 2 by a user by means of the lock key has the effect of pivoting the cam 4 clockwise F3, the control finger 6 cooperating with the first inclined indexing surface 14a to be translated slightly in the support 9 in the direction F1, compressing the resilient return means 7. The user feels this change in the force to be exerted to activate the lock key which indexes the departure from the neutral position STOP of the cam 4.

Then, when the cam 4 pivots between the neutral position STOP and the intermediate position OPERATE of the forward track A, the control finger 6 pivots according to the arrow F2 (FIG. 7) passing below the peripheral end edge of the cam 4. Having thus pivoted, the control finger 6 remains in abutment against the peripheral end edge of the cam 4 at the moment when the control finger 6 "passes" in front of the return track R.

The control finger 6 then cooperates with the second inclined indexing surface 14b of the return track A, leaving the control finger 6 to emerge progressively from the support 9 (according to the arrow F1 in FIG. 8) to index the arrival of the cam 4 in the intermediate position OPERATE. In this intermediate position, the driver may rotate the cam 4 into the start position START or toward the initial neutral position STOP. The departure from the intermediate position OPERATE returning toward the STOP position is indexed by the second inclined indexing surface 14b. Moreover, in the intermediate position OPERATE, the return spring of the cam 4 (not shown) comes into engagement with the cam and participates with the indexing thereof, returning the cam toward the intermediate position OPERATE.

When the user continues to rotate the lock key in the clockwise direction as far as the start position START, the axial abutment of the forward track A retracts, allowing the axially urged control finger 6 to be translated, protruding from the support 9 (in the direction of the arrow F1 in FIG. 9) toward the axial abutment 8 of the return track R, offset axially from the axial abutment of the forward track. Thus, the cam profile 5 causes the control finger 6 of the forward track A to rock toward the return track R.

Figure 10:
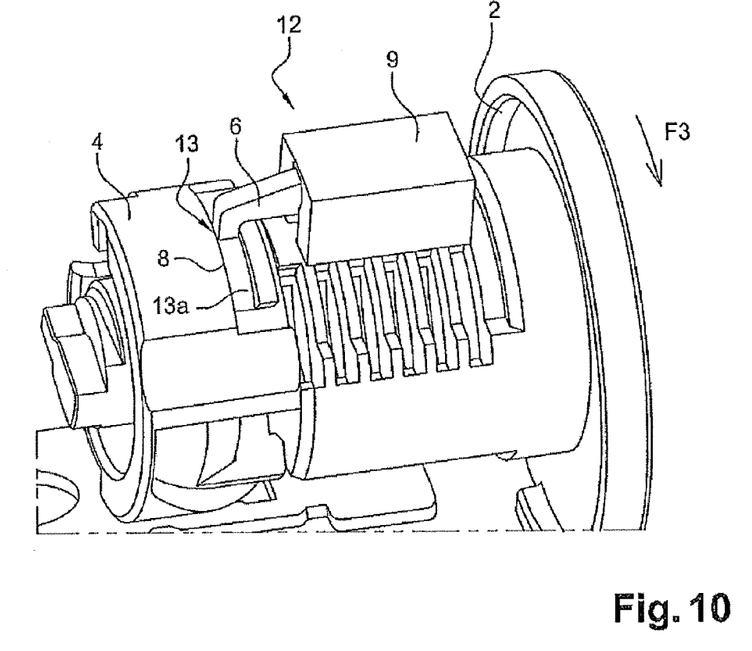
FIG. 10 is a view of the elements of FIG. 2 coupled to a pull for driving the antitheft bolt, the cam being in the intermediate position on the return rotational trajectory.
Figure 11:
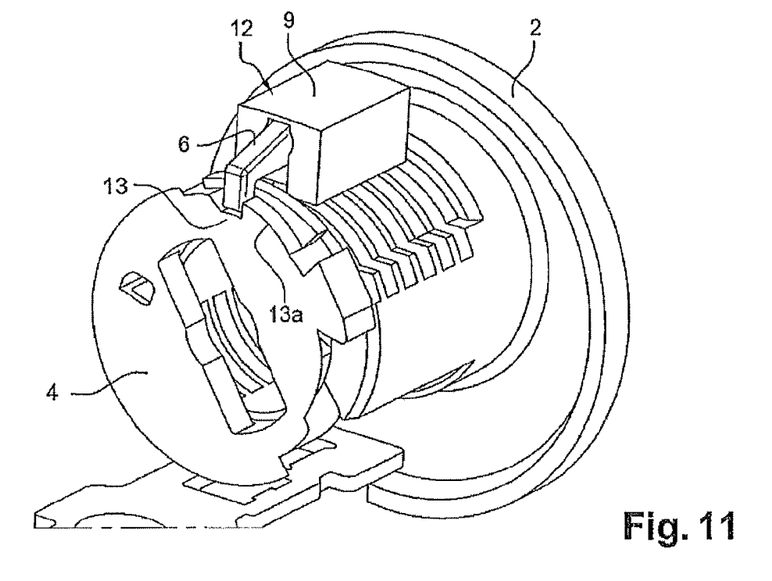
FIG. 11 is a view of the elements of FIG. 2, the cam being viewed in radial section in the intermediate position on the return rotational trajectory.
Figure 12:
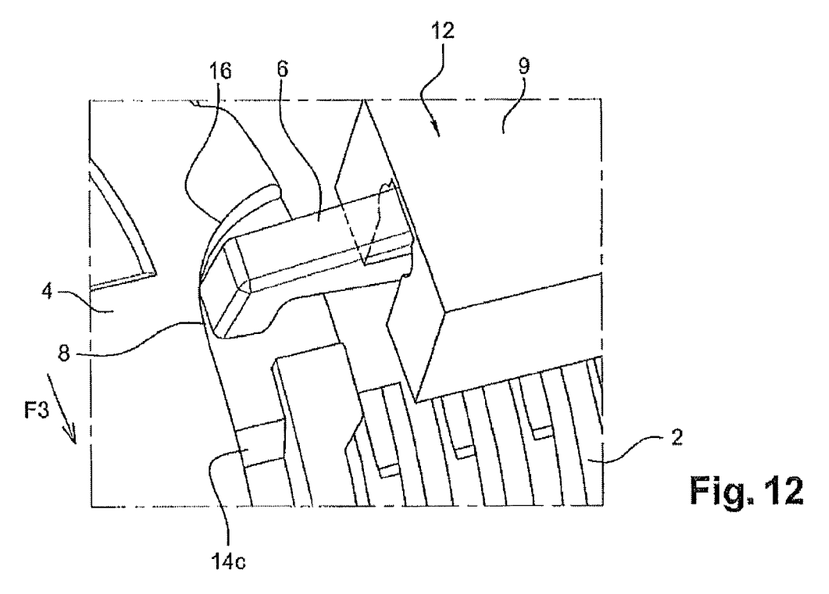
FIG. 12 is a view of the elements of FIG. 2, the cam being in the process of pivoting between the intermediate position and the neutral position on the return rotational trajectory.

After the start position, the cam 4 is resiliently returned into the intermediate position OPERATE (rotation in the anti-clockwise direction of the arrow F3 in FIG. 10). On the return track R, the upstream ramp portion 13a of the step of the non-return relief portion 13 causes the control finger 6 to pivot counter to its resilient return motion. Then the control finger 6 falls from the step in the intermediate position OPERATE (FIGS. 10 and 11). The transverse wall 13b cooperates with the control finger 6 to block the rotation in the opposite direction of the cam 4 into the start position START. The arrival of the control finger 6 in the intermediate position OPERATE is indexed by the shape of the step of the non-return relief portion 13.

Figure 6:
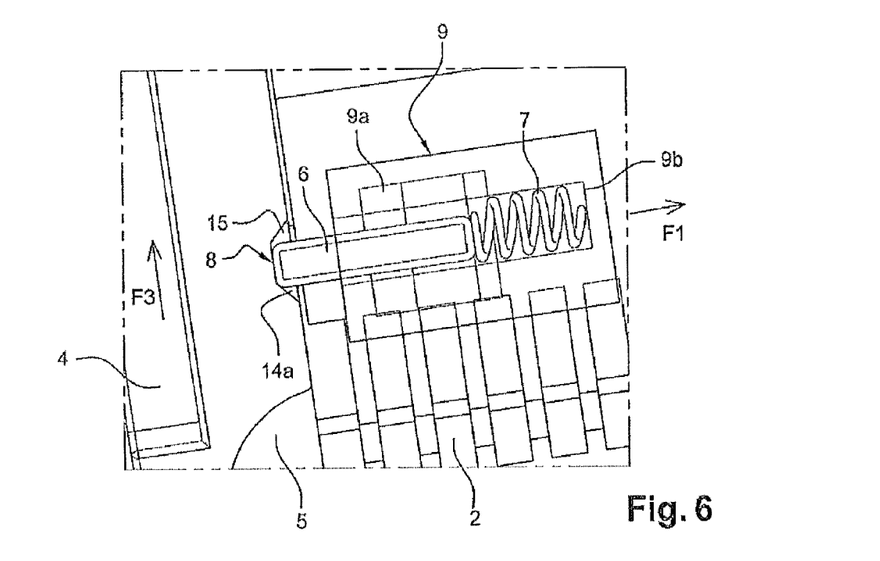
FIG. 6 is a view from above of the antitheft device of FIG. 2.
Figure 7:
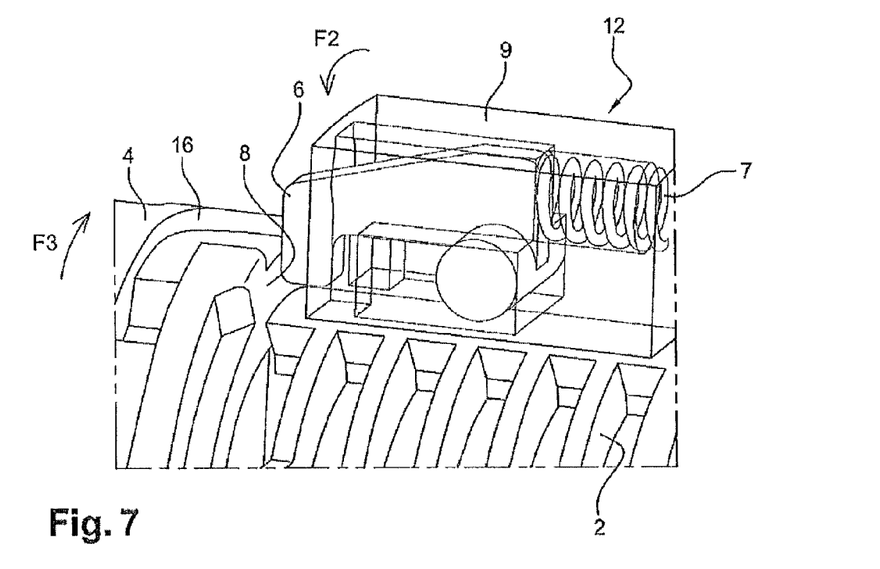
FIG. 7 is a view of the elements of FIG. 2 in which the cam is in the process of pivoting between the neutral position and an intermediate position on a forward rotational trajectory.
Figure 8:
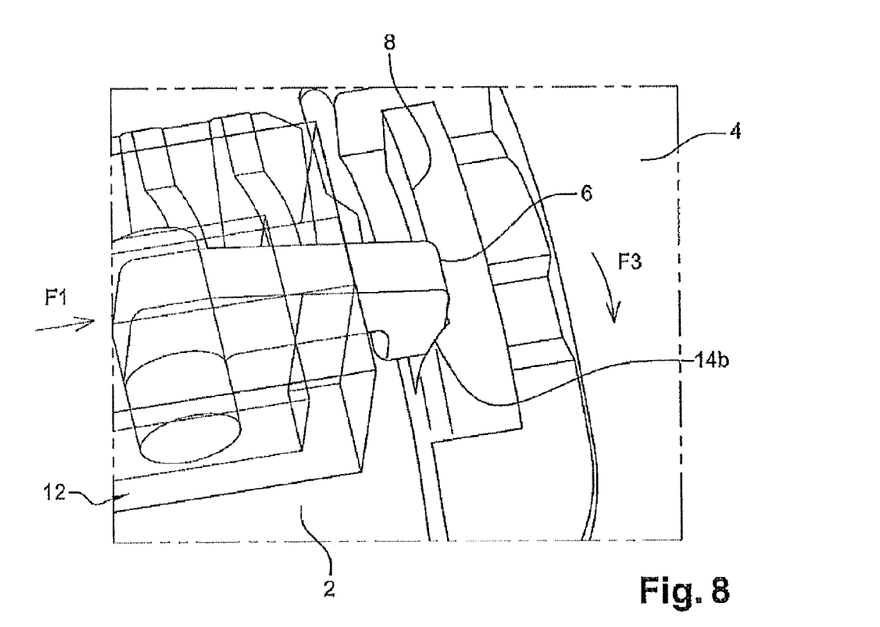
FIG. 8 is a view of the elements of FIG. 2, the cam being in the intermediate position on the forward rotational trajectory.
Figure 9:
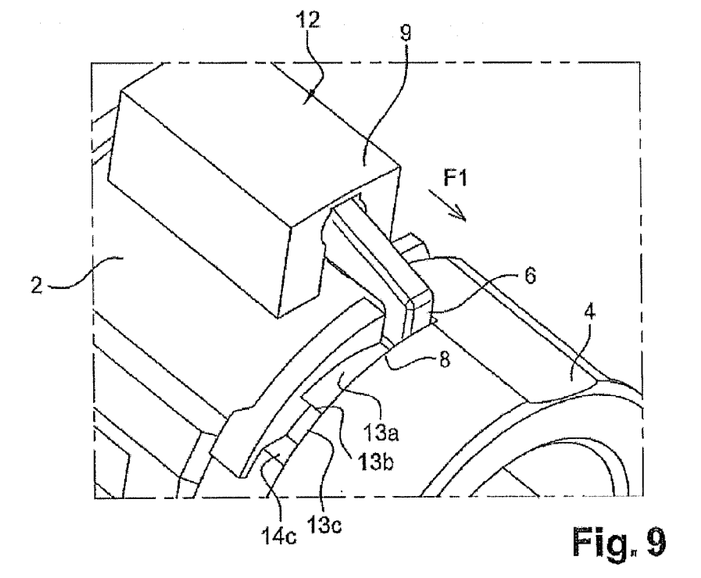
FIG. 9 is a view of the elements of FIG. 2, the cam being in the start position.

Thus, the driver is not able to return the lock key into the start position START without firstly passing again via the neutral position, in this case the position STOP. To achieve this, the driver has to continue to rotate the key anti-clockwise (arrow F3 in FIG. 12). The control finger 6 then cooperates with the third inclined indexing surface 14c to index the departure of the cam 4 from the intermediate position OPERATE. Then, the control finger 6 comes into abutment on the rounded portion 16, progressively returning the control finger 6 into the support 9, to guide it progressively below the peripheral end edge of the cam 4 (FIG. 7). Finally, the control finger 6 cooperates again with the first inclined indexing surface 14a and the hollow portion 15 to index the arrival in the neutral position STOP of the cam 4 (FIGS. 2 and 6). The user may then make a further attempt at starting without risking damaging one of the mechanical elements required for the correct operation of the vehicle.

Although an antitheft device has been described here, the further passage thereof via the position STOP being necessary to permit a further actuation into the start position, other alternatives may be envisaged.

In particular, the neutral position required for further authorisation for actuating the starting procedure may be an accessory position "ACC", i.e. an intermediate position itself between a position STOP and a position OPERATE. In such an accessory position, accessories such as the dashboard, car radio or fan are typically supplied with power by the battery.

Such an embodiment is, for example, implemented by using the mechanical means described above as defining the position STOP but this time to define the accessories position, the position STOP thus being defined by mechanical means upstream of those described relative to a clockwise direction of rotation of the lock, in a manner known per se by the person skilled in the art.

The invention claimed is:

1. A steering lock antitheft device for a motor vehicle comprising:
an antitheft body configured to receive a lock capable of rotating between a neutral position (STOP) and a start position (START), wherein the lock passes an intermediate position (OPERATE) when rotating between the neutral and start positions;
a cam designed to be fixed in rotation to the lock to actuate the locking means of the antitheft device as a function of the position of the lock;
non-return means to prevent said cam from rotating in the opposite direction toward the start position (START) once the cam has reached the intermediate position (OPERATE) when the cam passes from the start position (START) to the neutral position (STOP) without first passing via the neutral position (STOP),
wherein a cam profile is formed in a radial wall of said cam; and
a control finger and a resilient return means for said control finger counter to the action of said cam profile, said cam profile and said control finger cooperating, on the one hand, to form a non-return means and, on the other hand, to index the angular position of the cam,
further comprising a support bearing the control finger in addition to a resilient return means for the control finger counter to the action of the cam profile, the assembly formed by the support, the control finger and the resilient return means forming a non-return and indexing module which is arranged such that said module is able to be manipulated before being associated with said antitheft device and the elements of the module remain assembled together during such a manipulation without having to act to keep said elements assembled together.

2. The antitheft device as claimed in claim 1, wherein the control finger is urged to pivot toward the cam profile and in axial translation against an axial abutment of the cam profile.

3. The antitheft device as claimed in claim 2, further comprising a support in which a guide rail is formed and wherein the control finger has a shaped portion to translate and pivot in the guide rail.

4. The antitheft device as claimed in claim 3, wherein said shaped portion has a cylindrical shape.

5. The antitheft device as claimed in claim 3, wherein said resilient return means is interposed between one end of the control finger and said support.

6. The antitheft device as claimed in claim 2, wherein said cam profile comprises:
a forward track cooperating with the control finger on a forward rotational trajectory of the cam from the neutral position (STOP) to the start position (START), wherein the lock passes the intermediate position (OPERATE) when rotating between the neutral and start positions; and
a return track cooperating with the control finger on a return rotational trajectory of the cam from the start position (START) to the neutral position (STOP) passing the intermediate position (OPERATE), the return track further comprising a radial non-return relief portion cooperating with the control finger in the intermediate position (OPERATE) to block the rotation in the opposite direction of the cam toward the start position (START).

7. The antitheft device as claimed in claim 6, wherein said radial non-return relief portion comprises a step.

8. The antitheft device as claimed in claim 7, wherein the step has an upstream ramp portion, a transverse wall and a hollow portion perpendicular to said transverse wall, the upstream ramp portion thickening radially as far as the transverse wall.

9. The antitheft device as claimed in claim 6, wherein said cam profile has at least one inclined indexing surface cooperating with the control finger to index the departure from, or the arrival into, a neutral position (STOP) or intermediate position (OPERATE) of the cam.

10. The antitheft device as claimed in claim 9, wherein the axial abutment has a first inclined indexing surface followed by a hollow portion cooperating with the control finger to index the departure from, or the arrival into, the neutral position (STOP) of the cam, in that the axial abutment of the forward track has a second inclined indexing surface cooperating with the control finger to index the arrival into, or the departure from, the intermediate position (OPERATE) of the cam, and wherein the return track of the cam profile has a third inclined indexing surface cooperating with the control finger to index the departure of the cam from the intermediate position (OPERATE).

11. The antitheft device as claimed in claim 6, wherein the axial abutment of the forward track retracts into the start position (START) to permit the control finger to cooperate with the axial abutment of the return track offset axially from the axial abutment of the forward track.

12. The antitheft device as claimed in claim 6, wherein the axial abutment of the cam profile is formed by a peripheral end edge of the cam between the neutral position (STOP) and the intermediate position (OPERATE) of the forward track.

13. The antitheft device as claimed in claim 12, wherein the axial abutment of the return track has a rounded portion between the intermediate (OPERATE) and neutral (STOP) positions, to guide the return of the control finger below the peripheral end edge of the cam.

* * * * *